United States Patent
Nadiminti

(10) Patent No.: US 11,436,107 B2
(45) Date of Patent: Sep. 6, 2022

(54) RECOVERY MANAGEMENT SYSTEM AND METHOD FOR RESTORING A COMPUTING RESOURCE

(71) Applicant: Hewlett Packard Enterprise Development LP, Houston, TX (US)

(72) Inventor: Syama Sundararao Nadiminti, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/249,913

(22) Filed: Mar. 18, 2021

(65) Prior Publication Data

US 2021/0334175 A1 Oct. 28, 2021

(30) Foreign Application Priority Data

Apr. 24, 2020 (IN) .............................. 202041017711

(51) Int. Cl.
*G06F 11/00* (2006.01)
*G06F 11/14* (2006.01)
*G06F 16/172* (2019.01)
*G06F 11/20* (2006.01)

(52) U.S. Cl.
CPC ...... *G06F 11/1469* (2013.01); *G06F 11/1461* (2013.01); *G06F 11/2094* (2013.01); *G06F 16/172* (2019.01); *G06F 2201/82* (2013.01)

(58) Field of Classification Search
CPC ............. G06F 11/1448; G06F 11/1451; G06F 11/1458; G06F 11/1461; G06F 11/1469; G06F 11/2094; G06F 2201/82
See application file for complete search history.

(56) References Cited

U.S. PATENT DOCUMENTS 10,055,420 B1    8/2018   Pogde et al.
10,802,928 B2 *  10/2020  Matsui ................ G06F 11/1469
10,877,931 B1    12/2020  Nadiminti et al.
(Continued)

OTHER PUBLICATIONS

Nemoto, Jun et al., Directory-Aware File System Backup to Object Storage for Fast On-Demand Restore, 2017, International Journal of Smart Computing and Artificial Intelligence, vol. 1, No. 1, p. 1-19 (Year: 2017).*

(Continued)

*Primary Examiner* — Marc Duncan
(74) *Attorney, Agent, or Firm* — Hewlett Packard Enterprise Patent Department

(57) ABSTRACT

Examples described herein relate a method, a system, and a non-transitory machine-readable medium for restoring a computing resource. The method may include determining whether the computing resource is required to be restored on a recovery node using a backup of the computing resource stored in a backup storage node. A resource restore operation may be triggered on the recovery node in response to determining that the computing resource is required to be restored. The resource restore operation include copying a subset of the objects from the backup to the recovery node to form, from the subset of objects, a partial filesystem instance of the computing resource on the recovery node that is operable as a restored computing resource on the recovery node.

20 Claims, 8 Drawing Sheets

(56) References Cited

U.S. PATENT DOCUMENTS

| | | | |
|---|---|---|---|
| 2012/0215980 A1* | 8/2012 | Auchmoody | G06F 16/10 |
| | | | 711/E12.017 |
| 2012/0284236 A1 | 11/2012 | Timashev et al. | |
| 2014/0201153 A1 | 7/2014 | Vijayan et al. | |
| 2016/0085574 A1* | 3/2016 | Dornemann | G06F 3/0617 |
| | | | 718/1 |
| 2016/0170844 A1* | 6/2016 | Long | G06F 11/1469 |
| | | | 707/679 |
| 2020/0250232 A1 | 8/2020 | Bhattacharya et al. | |
| 2020/0301881 A1 | 9/2020 | Bhattacharya et al. | |
| 2020/0326856 A1* | 10/2020 | Kronrod | G06F 3/0644 |
| 2021/0255771 A1* | 8/2021 | Kilaru | G06F 3/0664 |

OTHER PUBLICATIONS

Hewlett Packard Enterprise; "HPE SimpliVity RapidDR data sheet"; Jul. 2019, Rev. 4; 2 pages.

Rhea, S., etal.; "Fast, Inexpensive Content-Addressed Storage in Foundation"; USENIX Annual Technical Conference; 2008; pp. 143-156; USENIX Association.

\* cited by examiner

RECOVERY MANAGEMENT SYSTEM AND METHOD FOR RESTORING A COMPUTING RESOURCE

BACKGROUND

Computing systems may be connected over a network. Data may be transmitted between the computing systems over the network for various purposes, including processing, analysis, and storage. Computing systems may operate data virtualization platforms that control how data is stored.

BRIEF DESCRIPTION OF THE DRAWINGS

These and other features, aspects, and advantages of the present specification will become better understood when the following detailed description is read with reference to the accompanying drawings in which Ike characters represent like parts throughout the drawings, wherein.

Figure 1:
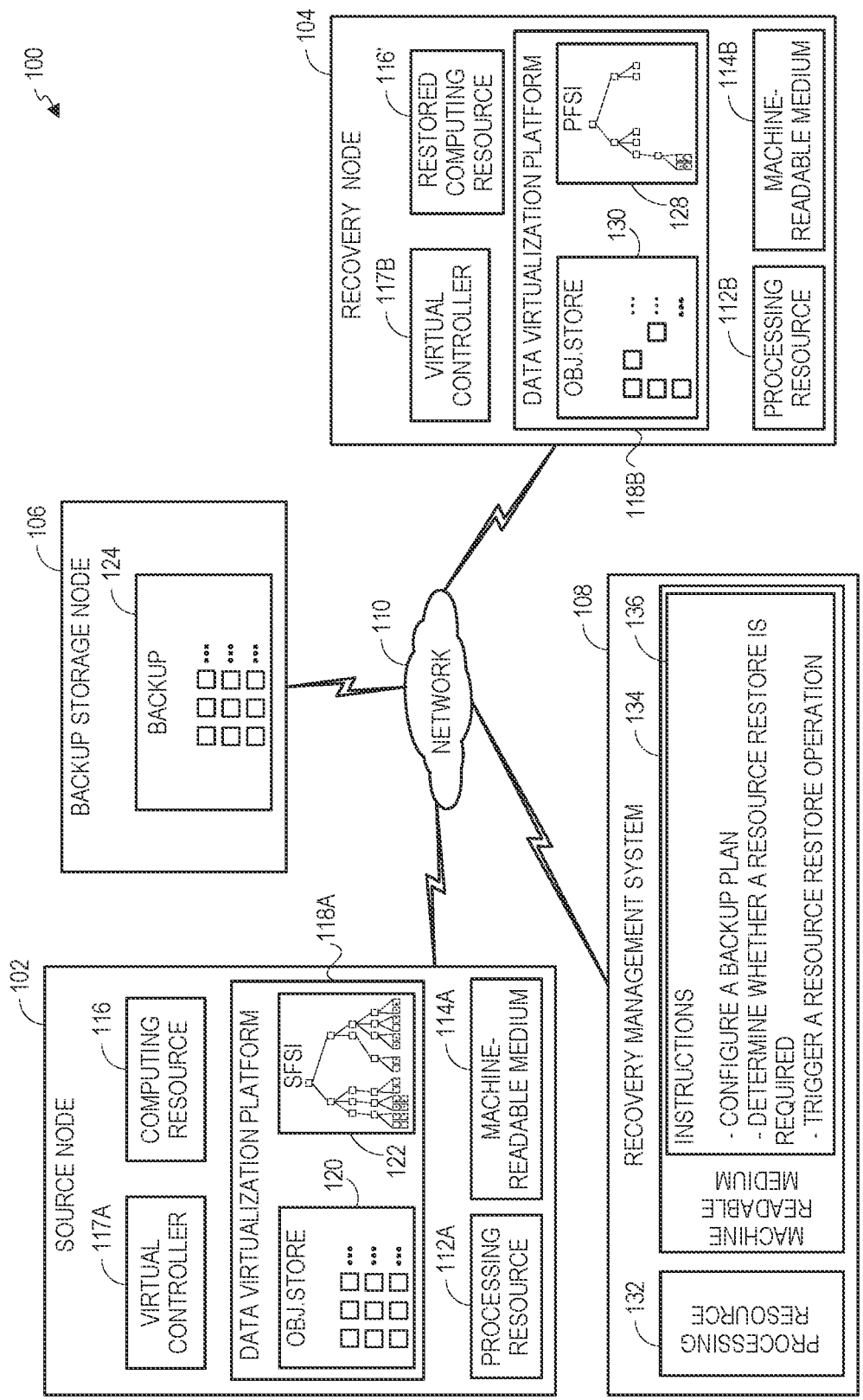
FIG. 1 is a block diagram of a system including a recovery management system to restore a computing resource on a recovery node, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Data may be stored on a system, such as a server, a storage array, a cluster of servers, a computer appliance, a workstation, a storage system, a converged system, a hyperconverged system, or the like. In some examples, data may relate to a computing resource such as, but not limited to, a virtual machine, a container, a database, a data store, a logical disk, or a containerized application. Some such systems storing the data about the computing resource may also provide data protection by maintaining a backup of an original data corresponding to the computing resource. The backup may include a copy of the original data that may be helpful in restoring the original data after a data loss event.

Some systems may provide native data protection in coordination with another like system, for example, providing backup and recovery between first and second like systems (i.e., systems that are of same type or using same architecture). The native data protection between such like systems, for example, among hyperconverged systems having the same architecture, may take advantage of a tightly integrated set of shared features such as efficient deduplication and compression, to provide short backup windows, low Recovery Time Objective (RTO), and low Recovery Point Objective (RPO). However, utilizing data protection for backup and recovery between such like systems may, at times, be costly (e.g., on a price per unit storage basis). Additionally, at times, utilizing the data protection for backup and recovery between the like systems may also compete with primary storage capacity needs on those systems.

Moreover, certain regulations, for example, HIPAA (the Health Insurance Portability and Accountability Act), may require users to utilize a "platform break" backup solution, where the backup is protected using a different technology/architecture than a storage technology/architecture of the system (also referred to herein as a primary storage system) storing the original data. In some instances, some users may utilize a storage system (hereinafter referred to as an external storage) based on different technology/architecture than that of the primary storage system to store the backup. In such configuration, in an event of a failure associated with the primary storage system, the primary data may generally be restored on another system (hereinafter referred to as a second storage system) using third-party solutions. Some such third-party solutions rely on hypervisors to provide resource recovery, and may not be compatible with data path capabilities (e.g., efficient deduplication and compression) offered by the architecture of the primary storage solutions. Also, restoring of the computing resource using such third-party solutions entails copying entire backup of the computing resource from the external storage to the second storage system. Consequently, use of the third-party solutions may lead to increased RTO and increased RPO.

Accordingly, it may be useful to provide a data recovery or disaster management solution that can provide faster recovery of the computing resource on the second storage system and lead to enhanced (i.e., low) RTO and RPO. Moreover, it may be useful for such data recovery or disaster management solution to integrate without necessitating architectural changes to the primary storage system or the second storage system.

In accordance with aspects of the present disclosure, an example recovery management system and an example method for restoring operation of a computing resource are presented. The computing resource may be hosted on a source node. Further, a backup of the computing resource is stored in a backup storage node as a form of a content addressable storage of objects. In some examples, the method includes determining whether the computing resource is required to be restored on a recovery node. In response to determining that the computing resource is required to be restored, a resource restore operation may be triggered on the recovery node. The resource restore operation may include copying a subset of the objects from the backup to the recovery node from the backup storage node to form a partial filesystem instance of the computing resource on the recovery node such that the computing resource is operable on the recovery node using at least the partial filesystem instance.

As will be appreciated, the resource restore operation as effected by the example recovery management system may enable copying of merely the subset of the objects from the backup based on which operation of the computing resource may be initiated on the recovery node. In some examples, the subset of objects that are copied during the resource restore operation may include objects corresponding to one or more of a boot file, a read-ahead context file, and a cache file of the computing resource. As the subset of the objects that can operationalize the computing resource are copied, the computing resource may be initiated and operationalized faster in comparison to a traditional approach of downloading the entire backup. Moreover, since the example recovery management system which is external to the source node and the recovery node manages the resource recovery operation, architectural changes to the source node or the recovery node may not be required.

Referring now to the drawings, in FIG. 1, a block diagram of a system 100 is presented, in accordance with an example. In some examples, the system 100 may include a source node 102, a recovery node 104, a backup storage node 106, and a recovery management system 108. The source node 102 may host a computing resource 116 (described later). In some examples, the recovery management system 108 may trigger a resource recovery operation in an event of a failure condition associated with the source node 102 and/or the computing resource 116. The resource recovery operation enabled by the recovery management system 108 may cause the computing resource 116 to be restored on the recovery node 104 as a restored computing resource 116' using a backup (described later) of the computing resource 116 stored on the backup storage node 106 to operationalize the computing resource 116 on the recovery node 104.

The recovery node 104, the backup storage node 106, and the recovery management system 108 may be coupled to each other via a network 110. Examples of the network 110 may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. Communication over the network 110 may be performed in accordance with various communication protocols such as, but not limited to, Transmission Control Protocol and Internet Protocol (TCP/IP), User Datagram Protocol (UDP), IEEE 802.11 and/or cellular communication protocols. The communication over the network 110 may be enabled via a wired (e.g., copper, optical communication, etc.) or wireless (e.g., Wi-Fi®, cellular communication, satellite communication, Bluetooth, etc.) communication technologies. In some examples, the network 110 may be enabled via private communication links including, but not limited to, communication links established via Bluetooth, cellular communication, optical communication, radio frequency communication, wired (e.g., copper), and the like. In some examples, the private communication links may be direct communication links between the recovery node 104, the backup storage node 106, and the recovery management system 108.

In some examples, the source node 102 and the recovery node 104 may form a cluster to facilitate high-availability (HA) of resources, such as, the computing resource 116. The source node 102 and the recovery node 104 may each be a computer, a device including a processor or microcontroller and/or any other electronic component, or a device or system that may facilitate various compute and/or data storage services, for example. Examples of the source node 102 and the recovery node 104 may include, but are not limited to, a desktop computer, a laptop, a smartphone, a server, a computer appliance, a workstation, a storage system, or a converged or hyperconverged system, and the like. In some examples, the source node 102 and the recovery node 104 may have similar architecture. In the description hereinafter, architectural details of the source node 102 will be described for illustration purposes.

The source node 102 may include a processing resource 112A and a machine-readable medium 114A. Non-limiting examples of the processing resource 112A may include a microcontroller, a microprocessor, central processing unit core(s), an application-specific integrated circuit (ASIC), a field programmable gate array (FPGA), and etc. The machine-readable medium 114A may be a non-transitory storage medium, examples of which include, but are not limited to, a random access memory (RAM), a read-only memory (ROM), an electrically erasable programmable read-only memory (EEPROM), a flash memory, a hard disk drive, etc. The processing resource 112A may execute instructions (i.e., programming or software code, not shown) stored on the machine-readable medium 114A. Additionally or alternatively, the processing resource 112A may include electronic circuitry for performing the functionality described herein.

As depicted in FIG. 1, the computing resource 116 may be hosted on the source node 102. In some examples, the computing resource 116 may be hosted on a hypervisor executing on the processing resource 112A. In some examples, the hypervisor may be installed on the source node 102. The hypervisor may be a computer program, firmware, or a hardware that may facilitate hosting of one or more operating system instances (e.g., virtual machines, databases, containers, etc.) on a common processing resource. In some examples, the computing resource 116 may represent one such operating system instance. Examples of the computing resource 116 may be a virtual machine, a logical disk, database, a client, an application or computer program, a container, a containerized application, a folder, or combinations thereof. In certain other examples, the computing resource 116 may be any computing unit, module, application, appliance, or hardware that may function independent of the hypervisor. Although the source node 102 is shown to host the computing resource 116, in some examples, the source node 102 may host more than one computing resource as well, without limiting the scope of the present disclosure.

In certain examples, the computing resource 116 may be created, maintained, and managed, at least in part, by a virtual controller 117A. By way of example, the virtual controller 117A may be implemented using hardware devices (e.g., electronic circuitry, logic, or processors) or any combination of hardware and programming (e.g., instructions stored on the machine-readable medium 114A) to implement various functionalities described herein. For example, the virtual controller 117A may be a virtual machine hosted on the hypervisor. The virtual controller 117A may include, at least in part, instructions stored on the machine-readable medium 114A and executing on the processing resource 112A.

Furthermore, the source node 102 may include a data virtualization platform 118A. The data virtualization platform 118A may represent a virtualized storage that may include aspects (e.g., addressing, configurations, etc.) abstracted from data stored in a physical storage (not shown). The data virtualization platform 118A may be presented to a user environment (e.g., to the virtual machines, an operating system, applications, processes, etc.) hosted on the source node 102. In some examples, the data virtualization platform 118A may also provide data services such as deduplication, compression, replication, and the like. The data virtualization platform 118A may be created and maintained on the source node 102 by the processing resource 112A of the source node 102 executing software instructions stored on the machine-readable medium 114A of the source node 102.

As previously noted, in some examples, the source node 102 and the recovery node 104 may have similar architecture. For example, the recovery node 104 may also include components such as a processing resource 112B, a machine-readable medium 114B, a virtual controller 117A, and a data virtualization platform 118B. In some examples, the processing resource 112B, the machine-readable medium 118B, the virtual controller 117A, and the data virtualization platform 118B of the recovery node 104 may be analogous to the processing resource 112A, the machine-readable medium 114A, the virtual controller 117A, and the data virtualization platform 118A, respectively, of the source node 102, description of which is not repeated herein.

Referring again to the source node 102, in some examples, the data virtualization platform 118A may include an object store 120. The object store 120 may store objects (illustrated in FIG. 1 as square boxes inside the object store 120), including data objects and metadata objects. A file at the file protocol level (e.g., user documents, a computer program, etc.) may be made up of multiple data objects within the data virtualization platform 118A. The objects of the object store 120 may be identifiable by content-based signatures. The signature of an object may be a cryptographic digest of the content of that object, obtained using a hash function including, but not limited to, SHA-1, SHA-256, or MD5, for example.

Further, in some examples, the objects in the data virtualization platform 118A may be hierarchically arranged. Such hierarchical arrangement of the objects may be referred to as a filesystem instance or a hive. For illustration purpose, the data virtualization platform 118A is shown to include one such filesystem instance 122 which is hereinafter referred as a source filesystem instance 122 (labeled in FIG. 1 as "SFSI"). In particular, the source filesystem instance 122 may represent a hierarchical arrangement of at least some of the objects stored in the object store 120. It is understood that, in some examples, the data virtualization platform 118A may also include additional filesystem instances without limiting the scope of the present disclosure. Further, in some examples, the data virtualization platform 118A may export a file protocol mount point (e.g., a network filesystem (NFS) or a server Message Block (SMB) mount point) by which an operating system on the source node 102 can access the storage provided by the source filesystem instance 122 via a namespace of the file protocol mount point.

Figure 2:
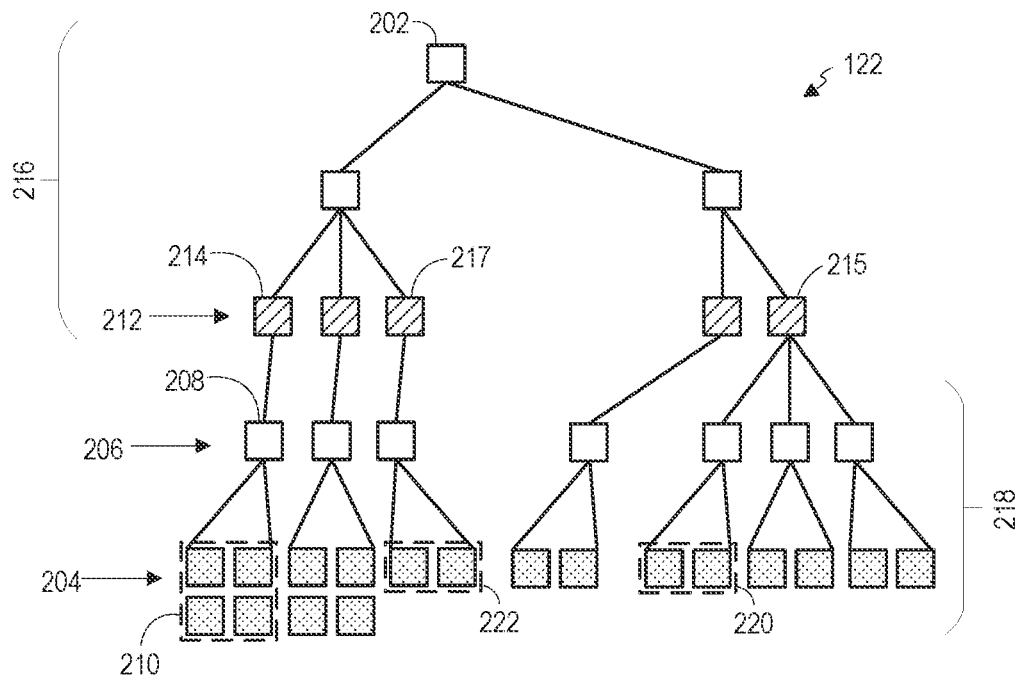
FIG. 2 is a source filesystem instance corresponding to the computing resource of FIG. 1, in accordance with an example.

Furthermore, one or more source filesystem instances may be dedicated to a computing resource. By way of example, in FIG. 1, in the description hereinafter, the source filesystem instance 122 will be described as being dedicated to the computing resource 116. Additional details regarding the source filesystem instance 122 will be described in conjunction with FIG. 2. For ease of illustration, description of FIG. 2 is integrated with FIG. 1. FIG. 2 depicts the source filesystem instance 122 corresponding to the computing resource 116 of FIG. 1, in accordance with an example.

In some examples, one or more objects in the source filesystem instance 122, may be related to a root object 202 in an object tree (e.g., a Merkle tree, as depicted in FIG. 2) or any other hierarchical arrangement (e.g., directed acyclic graphs, etc.). The root object 202 may store, as its content, a signature that may identify the entire source filesystem instance 122 at a point in time. The root object 202 may be an object from which metadata objects and data objects relate hierarchically. The number of branches and levels in the source filesystem instance 122 are for illustration purposes only. Greater or fewer number of branches and levels may exist in other example filesystem instances. Subtrees may have different numbers of levels. In some examples, the lowest level tree node of any branch (that is, most distant from the root object) is a data object that stores user data, also referred to as a leaf data object. In the example of FIG. 2, leaf objects 204 (filled with a dotted pattern) may represent the data objects. It may be noted that the objects (e.g., the data objects and the metadata objects) in the filesystem instance represent or act as pointers to respective objects in the object store 120. Content (e.g., metadata or data information) of the objects is stored in respective objects in the object store 120 which may in-turn occupy storage space from a physical storage underlying the data virtualization platform 118B.

Objects at levels above the leaf data objects 204 may be metadata objects containing signatures of child objects, and may be referred to as leaf metadata objects, for example, leaf metadata objects 206. The leaf metadata objects 206 may store, as its content, the signatures of its child leaf data objects 204. For example, a leaf metadata object 208 may include cryptographic hash signatures of content of child data objects 210. In some examples, the root object 202 and internal nodes of the object tree (e.g., objects at any level above the leaf data objects 204) may also be metadata objects that store, as content, the signatures of child objects. Any metadata object may be able to store a number of signatures that is at least equal to a branching factor of the hierarchical tree, so that it may hold the signatures of all of its child objects. In some implementations, data objects 204 may be larger in size than metadata objects 206, 214, etc.

Furthermore, in some examples, the objects filled with a pattern of angled lines may be referred to as inode file objects 212 (hereinafter referred to as modes 212. In some examples, the inodes 212 may also be metadata objects that can store cryptographic hash signatures of the leaf metadata object(s) 206 linked thereto. For example, an mode 214 may include a cryptographic hash signature of the leaf metadata object 208. In some examples, a tree structure of the source filesystem instance 122 from the root object 202 up to the modes 212 may be referred to as a metadata tree 216. Further, each leaf metadata object along with the data objects associated therewith may be referred to as a file object tree. For example, in the source filesystem instance 122, there exists various file object trees 218 linked to respective inodes 212.

As previously noted, a file at the file protocol level (e.g., user documents, a computer program, etc.) may be made up of multiple data objects. A file may be represented by a given one of the inode 212. Thus, the data objects comprising that file may be found in the file object tree linked under to the inode for that file. By way of example, the group of objects 210 may correspond to a boot file (alternatively referred to as a boot image) of the computing resource 116. In other words, the objects 210 may form, at least partially, the boot file that is useful to boot the computing resource 116. In the present example, the boot file may be represented by the inode 214. Further, in some examples, objects 220 may correspond to a cache file of the computing resource 116. In some examples, the cache file may be, at least partially, made of the objects 220 and may include cached metadata and data corresponding to the computing resource 116. In some instances, the cache file of the computing resource 116 may also include certain other objects in addition to the objects 220. In the present example, the cache file may be represented by the inode 215. Moreover, in certain examples, objects 222 may correspond to a read-ahead context file of the computing resource 116. In some examples, the read-ahead context file may be, at least partially, made of the objects 222 and may include read-ahead prediction details corresponding to the computing resource 116. In some instances, the read-ahead context file of the computing resource 116 may include certain other objects in addition to the objects 222. In the present example, the read-ahead context file may be represented by the inode 217. Similarly, the rest of the objects 204 may correspond to various other files associated with the computing resource 116.

Moreover, in some examples, the root object 202 may store information about the inodes 212. For example, the root object 202 may store a list of inodes 212 and description about each of the inodes 212 as its metadata. For example, information indicating that the inodes 214, 215, and 217 being representative of the boot file, the cache file, and the read-ahead context file, respectively, may be stored in the root object 202 as metadata. Further, each inode 212 may include various information about a file that it represents. For example, each inode 212 may represent information including, but not limited to, a file size, a file name, file permissions, extended attributes, and the like, corresponding to the file that the inode 212 represents.

Referring again to FIG. 1, as will be appreciated, it is useful to store a backup of data stored in the source node 102 so that the data can be recovered in case of any failure condition associated with the source node 102. Accordingly, in accordance with some examples, a backup of the computing resource 116 of source node 102 may be stored on the backup storage node 106. In particular, in some examples, the source filesystem instance 122 corresponding to the computing resource 116 may be backed-up on the backup storage node 106.

In some examples, the backup storage node 106 may belong to a class of storage systems that may be economical and suitable for long-term archival. For example, the backup storage node 106 may use less expensive media than those used on the source node 102 or the recovery node 104. The backup storage node 106 may operate using a different architecture than the source node 102 or the recovery node 104. In this sense, the backup storage node 106 may serve as a platform break system for providing data protection to the primary storage system 100. In certain examples, the backup storage node 106 may be hosted in a cloud (public, private, or hybrid). In certain other examples, the backup storage node 106 may store an additional copy of the backup 124 on a cloud based storage (not shown). Further, in some examples, the backup 124 may be managed via the recovery management system 108 (described later).

In some examples, the source filesystem instance 122 may be backed-up at regular intervals on the backup storage node 106, fully or with incremental changes. It may be noted that the present disclosure is not limited with respect to method(s) of storing the backup 124 on the backup storage node 106. In some examples, the backup storage node 106 may be capable of facilitating features such a data deduplication and compression, to provide short backup windows, low Recovery Time Objective (RTO), and low Recovery Point Objective (RPO).

In some examples, the backup 124 of the computing resource 116 may be stored on the backup storage node 106. The backup 124 may be stored in a form of a content addressable storage of objects. In some examples, the backup 124 may represent a point-in-time copy of the source filesystem instance 122. In some examples, at any point in time or at regular update intervals, the backup 124 may include of the objects of the source filesystem instance 122. In some examples, the backup 124 may be a store (e.g., a repository) that includes content addressable objects (illustrated in FIG. 1 as square boxes inside the backup 124) corresponding to the source filesystem instance 122. By way of example, the backup 124 stored on the backup storage node 106 may include all of the leaf data objects 204, the leaf metadata objects 206, the inodes 212, the root node/object 202 of the source filesystem instance 122 (see FIG. 2). As previously noted, the metadata objects may include a cryptographic hash signatures of child objects linked thereto. In certain examples, the backup 124 may, optionally, store intermediate metadata objects between the root object 202 and the inodes 212.

In some other examples, the backup storage system 106 may store a backup of the computing resource 116 in the form of a backup filesystem instance (see FIG. 3) which may look like a replica of the source filesystem instance 122. In certain other examples, the backup storage system 106 may store the backup of the computing resource 116 in any other format, without limiting the scope of the present disclosure.

Moving back to FIG. 1, in some examples, the backup 124 stored on the backup storage node 106 may be useful to restore the computing resource 116 on another system, for example, the recovery node 104, in an event the source node 102 or the computing resource 116 on the source node 102 have experienced a failure condition. The computing resource 116 restored on the recovery node 104 may be referred to as the restored computing resource 116'. In some examples, the recovery management system 108 may enable restoration of the computing resource 116 as the restored computing resource 116' on the recovery node 104 using the backup 124 stored on the backup storage node 106. The recovery management system 108 may provide a data recovery or disaster management solution that can provide faster recovery of the computing resource 116 (as the restored computing resource 116') on the recovery node 104 and lead to enhanced (i.e., low) RTO and RPO without necessitating architectural changes to the recovery node 104 or the backup storage node 106.

In some examples, the recovery management system 108 may be a physical device, for example, a physical computing device separate from the source node 102, the recovery node 104, and the backup storage node 106. In some other examples, the recovery management system 108 may be hosted on a host computing device as an application, a virtual machine, a container, or a containerized application. In one example, the host computing device may be separate from the source node 102, the recovery node 104, and the backup storage node 106. In certain examples, the host computing device may be any of the source node 102, the recovery node 104, and the backup storage node 106.

The recovery management system 108 may include a processing resource 132 and a machine-readable medium 134. The processing resource 132 may be coupled to the machine-readable medium 134. In an example when the recovery management system 108 is implemented as an application, a virtual machine, a container, or a containerized application on the host computing device, the processing resource 132 and the machine-readable medium 134 represent a processing resource and a machine-readable medium of that host computing device.

The machine-readable medium 134 may be any electronic, magnetic, optical, or other physical storage device that may store data and/or executable instructions, for example, instructions 136. Therefore, the machine-readable medium 134 may be, for example, Random Access Memory (RAM), an Electrically Erasable Programmable Read-Only Memory (EEPROM), a storage drive, a flash memory, a Compact Disc Read Only Memory (CD-ROM), and the like. The machine-readable medium 134 may be non-transitory. As described in detail herein, the machine-readable medium 134 may be encoded with executable instructions 136 for performing one or more methods, for example, methods described in FIGS. 4-5.

Further, the processing resource 132 may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of retrieving and executing of the instructions 136 stored in the machine-readable medium 134, or combinations thereof. The processing resource 132 may fetch, decode, and execute the instructions 136 stored in the machine-readable medium 134 to facilitate recovery of the computing resource 116 as the restored computing resource 116' on the recovery node 104. As an alternative or in addition to executing the instructions 136, the processing resource 132 may include at least one integrated circuit (IC), control logic, electronic circuits, or combinations thereof that include a number of electronic components for performing the functionalities intended to be performed by the recovery management system 108.

In some examples, the processing resource 132 of the recovery management system 108 may execute one or more of the instructions 136 to configure a backup plan for a computing resource 116 to store the backup 124 of the computing resource 116 in the backup storage node 106 as a content addressable storage of objects. Additional details of configuring the backup plan will be described in conjunction with FIG. 5.

Further, in some examples, the processing resource 132 of the recovery management system 108 may execute one or more of the instructions 136 to determine whether the computing resource 116 is required to be restored on the recovery node 104 using the backup 124 stored in the backup storage node 106. The recovery management system 108 may determine that the computing resource 116 is required to be restored if any of the source node 102 and the computing resource 116 is experiencing a failure condition. The term "failure condition" as used herein may refer to a separation of the source node 102 from the network 110, complete or partial failure, damage, and/or malfunctioning of the source node 102 or any internal components thereof such as the computing resource 116, the virtual controller 117A, the processing resource 112A, and the second machine-readable medium 114A.

In an event of such failure condition, the processing resource 132 of the recovery management system 108 may execute one or more of the instructions 136 to trigger a resource restore operation on the recovery node 104. The resource restore operation may enable copying of a subset of the objects from the backup 124 to form a partial filesystem instance 128 (labeled as PFSI in FIG. 1) on the recovery node 104 based on which operation of the computing resource 116 may be initiated on the recovery node 104.

In some examples, the subset of the objects that may be copied from the backup 124 to the recovery node 104 may include the objects corresponding to the metadata tree 216 and certain other objects, for example, the objects 210 corresponding to the boot file, the objects 220 corresponding to the cache file, or the objects 222 corresponding to the read-ahead context file and related leaf meta data objects that may be useful to operationalize the computing resource 116 as the restored computing resource 116' on the recovery node 104. The subset of objects copied/transferred to the recovery node 104 may be stored in the object store 130 of the recovery node 104. In other words, the copied objects are said to be "materialized" on the recovery node 104. Rest of the data objects 204 and the lead metadata objects that are not copied to the recovery node 104 are considered to be "unmaterialized" on the recovery node 104.

As can be seen in FIG. 1, the partial filesystem instance 128 include certain materialized objects which can operationalize the computing resource 116 as the restored computing resource 116' on the recovery node 104, As such, initially, the partial filesystem instance 128 may be a partial copy of the source filesystem instance 122 and may be alternatively referred to as a partially materialized filesystem instance 128. In some examples, the unmaterialized objects, gradually or on-demand, may be dynamically added to the partial filesystem instance 128. Additional details regarding the resource restore operation and formation of the partial filesystem instance 128 are described in conjunction with FIGS. 5 and 6A-6F.

As the subset of the objects which can operationalize the computing resource 116 as the restored computing resource 116' are copied to the recovery node 104, the computing resource 116 may be restored faster in comparison to a traditional approach of downloading the entire backup. Furthermore, in some examples, the recovery management system 108, in the resource recovery operation, may cause transfer of objects that are useful for initializing (e.g., booting) of the restored computing resource 116' on the recovery node 104 and certain other objects which can help operate the computing resource 116 as the restored computing resource 116' on the recovery node 104. Moreover, since the example recovery management system 108 which is external to the source node 102, the recovery node 104, and the backup storage node 106, manages such computing resource recovery operation, architectural changes to the recovery node 104 or the backup storage node 106 may not be required.

Figure 3:
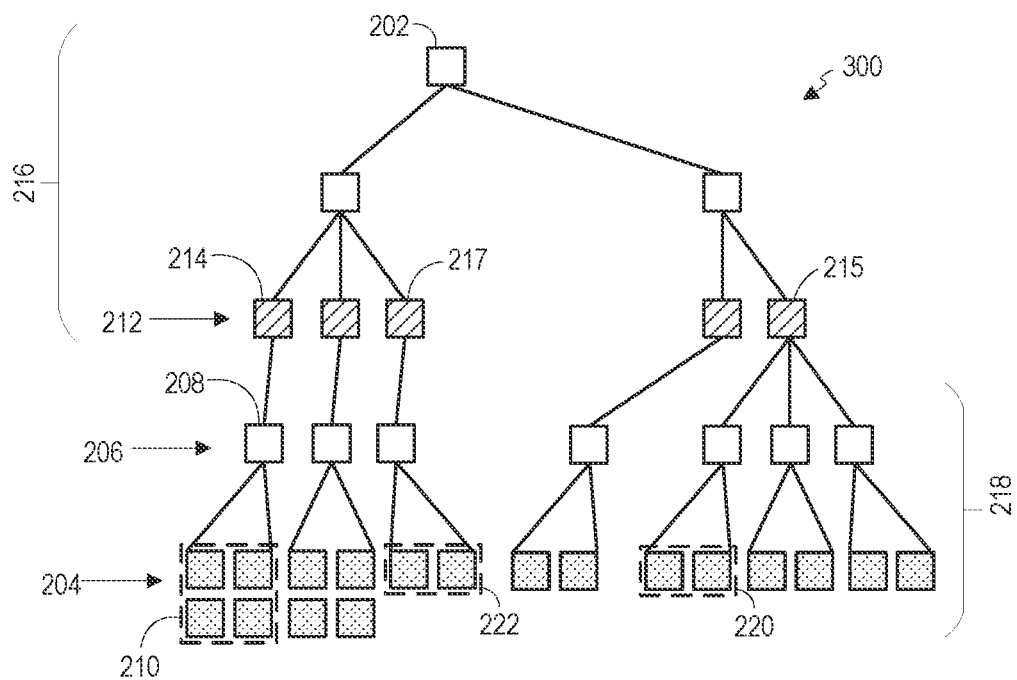
FIG. 3 is a backup filesystem instance corresponding to the computing resource of FIG. 1, in accordance with an example.

Referring now to FIG. 3, a backup filesystem instance 300 corresponding to the computing resource 116 operating on the source node 102 of FIG. 1 is depicted, in accordance with an example. The backup filesystem instance 300 may be a representative of the backup 124 and may be stored in the backup storage node 106, in some examples. Similar to the source filesystem instance 122, the backup filesystem instance 300 may also represent a hierarchical arrangement (e.g., a Merkle tree) of content addressable objects. The objects in the backup filesystem 300 may be same as the objects of the source filesystem instance 122. Accordingly, the backup filesystem instance 300 of FIG. 3, is also shown to include objects with similar reference numbers, description of which is not repeated herein. In some examples, the backup filesystem instance 300 may look like a replica of the source filesystem instance 122 stored on the source node 102.

Figure 4:
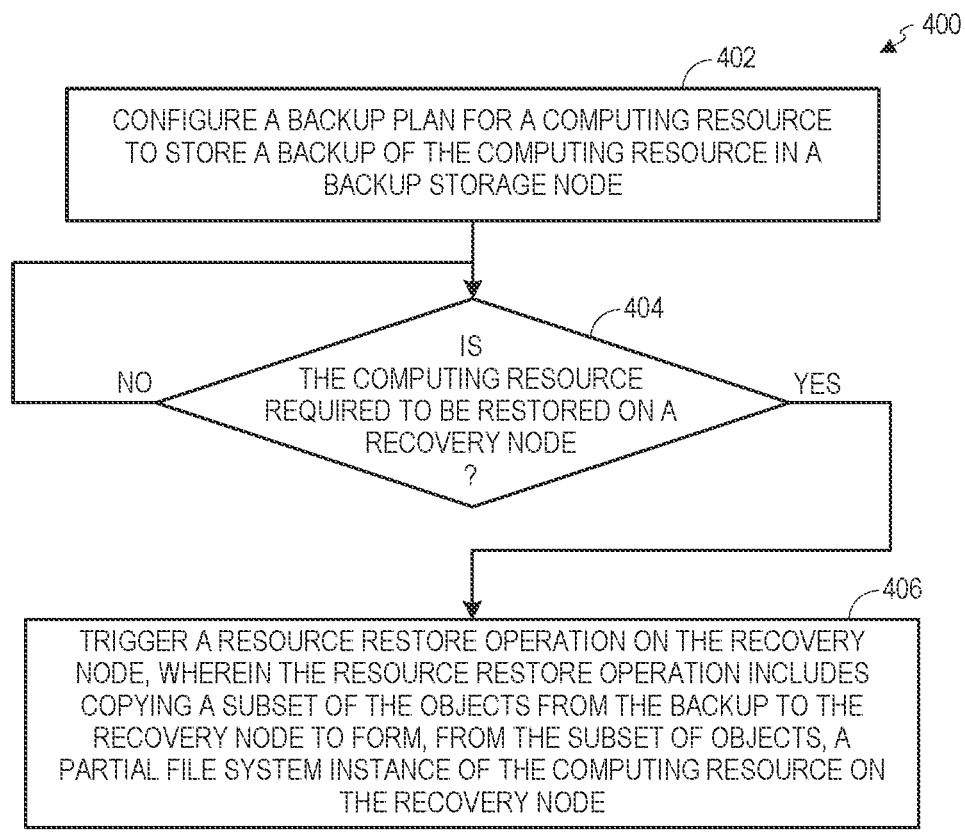
FIG. 4 is a flow diagram depicting a method for restoring a computing resource, in accordance with an example.

Referring now to FIG. 4, a flow diagram depicting a method 400 for restoring a computing resource, such as, the computing resource 116 is presented, in accordance with an example. For illustration purposes, the method 400 will be described in conjunction with the system 100 of FIG. 1. The method 400 may include method blocks 402, 404, and 406 (hereinafter collectively referred to as blocks 402-406) which may be performed by a processor based system, for example, the recovery management system 108. In particular, operations at each of the method blocks 402-406 may be performed by the processing resource 132 by executing the instructions 136 stored in the machine-readable medium 134 (see FIG. 1).

At block 402, a backup plan for the computing resource 116 may be configured to store the backup 124 of the computing resource 116 in the backup storage node 106 as a content addressable storage of objects. In some examples, configuring the backup plan by the recovery management system 108 may include defining how and at what time intervals the source filesystem instance 122 is backed-up in the backup storage node 106. Certain additional details regarding the configuring the backup plan will be described in conjunction with FIG. 5.

Further, at block 404, the recovery management system 108 may perform a check to determine whether the computing resource 116 is required to be restored on the recovery node 104 using the backup 124 of the computing resource 116 stored in the backup storage node 106. The recovery management system 108 may determine that the computing resource 116 is required to be restored if any of the source node 102 and the computing resource 116 is experiencing a failure condition. Alternatively, in certain examples, the recovery management system 108 may determine the need to restore the computing resource 116 based on a request from a user (e.g., an administrator received by the recovery management system 108. At block 404, if it is determined that the computing resource 116 is not required to be restored, the recovery management system 108 may continue to monitor an operating status the source node 102 and the computing resource 116 for any fault condition or wait for resource restore instruction from the user.

At block 404, if it is determined that the computing resource 116 is required to be restored, at block 406, the recovery management system 108 may trigger a resource restore operation on the recovery node 104. In some examples, the resource restore operation may include copying a subset of the objects from the backup 124 to the recovery node 104 to form, from the subset of objects, the partial filesystem instance 128 of the computing resource 116 on the recovery node 104 that is operable as the as the restored computing resource 116' on the recovery node 104. As can be seen in FIG. 1, the partial filesystem instance 128 include the subset of objects of the backup 124 which can operationalize the computing resource 116 as the restored computing resource 116' on the recovery node 104.

In some examples, the subset of objects copied to form the partial filesystem instance 128 may include objects corresponding to files that are useful to boot the as the restored computing resource 116' on the recovery node 104. In some examples, the subset of objects copied to form the partial filesystem instance 128 may include objects corresponding to a cache file that includes cached metadata and data corresponding to the computing resource 116 at the time of last update of the backup 124. Further, in some examples, the subset of objects copied to form the partial filesystem instance 128 may include objects corresponding to a read-ahead context file that includes read-ahead prediction details corresponding to the computing resource 116 at the time of last update of the backup 124. Details of the resource restore operation will be described in conjunction with FIG. 5.

Figure 5:
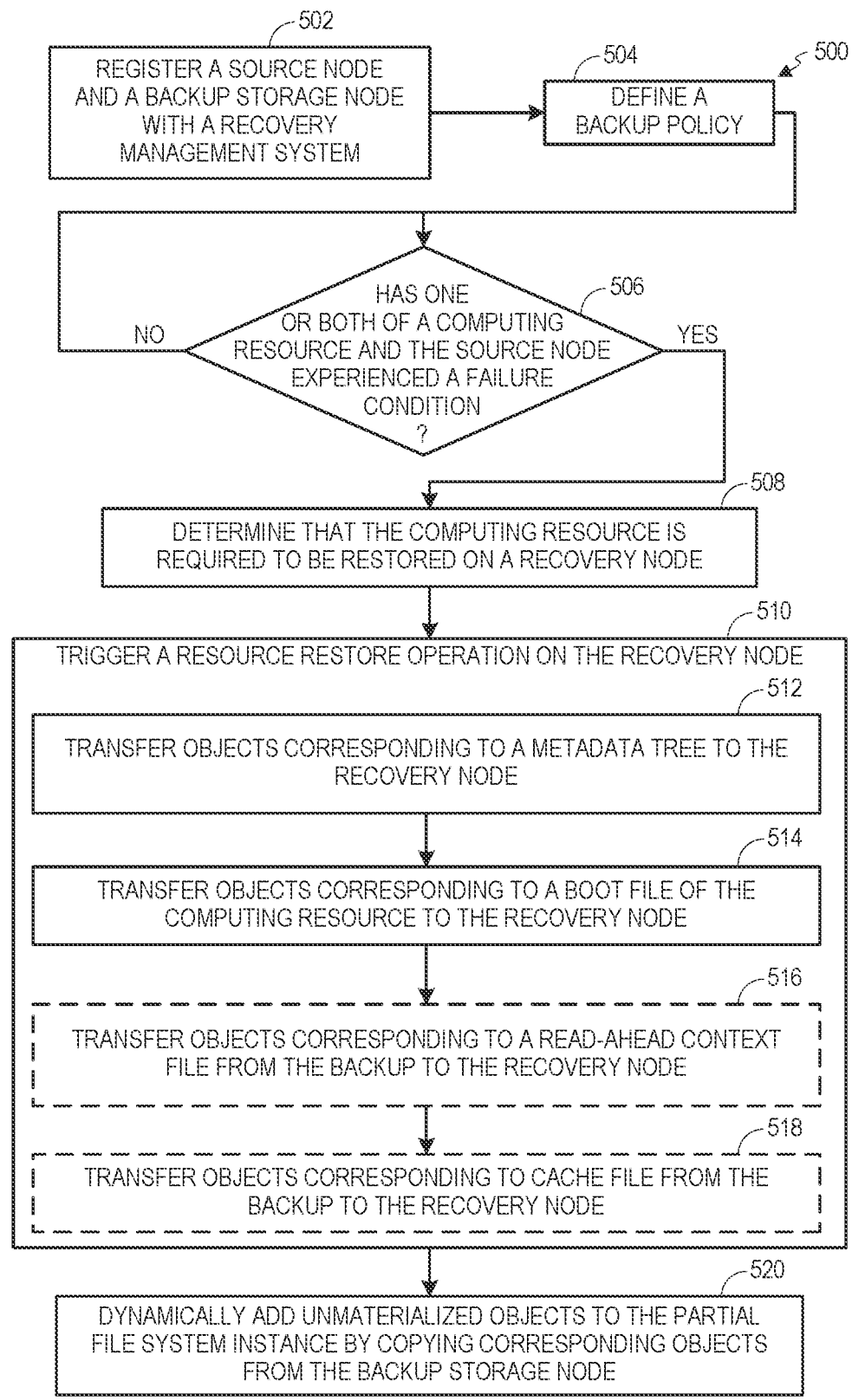
FIG. 5 is a flow diagram depicting a method for restoring a computing resource, in accordance with an example.

Moving to FIG. 5, a flow diagram depicting a detailed method 500 for restoring the computing resource 116 is presented, in accordance with an example. For illustration purposes, the method 500 will be described in conjunction with the system 100 of FIG. 1. The method 500 may include method blocks 502, 504, 506, 508, 510, 512, 514, 516, 518, and 520 (hereinafter collectively referred to as blocks 502-520) which may be performed by a processor based system, for example, the recovery management system 108, in some examples. In particular, operations at each of the method blocks 502-520 may be performed by the processing resource 132 by executing the instructions 136 stored in the machine-readable medium 134 (see FIG. 1). In some examples, the method 500 may include certain method blocks that describe various operations for certain blocks of the method 400 of FIG. 4. Further, FIGS. 6A-6F will also be referenced during description of certain blocks of the method 500. FIGS. 6A-6F depict partial filesystem instances formed on the recovery node 104 at various time instances during a resource recovery operation (see blocks 510-518), in accordance with an example.

Blocks 502 and 504 may represent operations performed to configure the backup plan (see block 402 of FIG. 4). For example, at block 502, the recovery manager system 108 may enable registration of the source node 102 and the backup storage node 106 to create and update a backup (e.g., the backup 124) of the computing resource 116 in the backup storage node 106. In some examples, the recovery manager system 108 may cause display (on a display—not shown) of a user interface by which a user or administrator can select resources to be backed-up and a destination system where a respective backup is to be stored. In the current example, the user may be able to select the computing resource 116 for which a backup (e.g., the backup 124) is to be created/updated. Further, the user can select the backup storage node 106 as the destination where the backup 124 of the computing resource 116 is to be stored.

Further, at block 504, the recovery management system 108 may also enable the user to define a backup policy to update the backup 124 of the computing resource 116 in the backup storage node 106. By way of example, defining the backup policy may include specifying a frequency at which the backup 124 is updated. In some examples, defining the backup policy may include defining timestamps at which the backup 124 is updated. In some examples, once the backup plan is configured, the backup 124 may be updated at regular intervals and/or frequencies specified in the backup policy.

Furthermore, in some examples, at block 506, the recovery management system 108 may perform a check to determine whether one or both of the computing resource 116 and the source node 102 have experienced a failure condition. As noted earlier, the "failure condition" may refer to a separation of the source node 102 from the network 110, complete or partial failure, damage, and/or malfunctioning of the source node 102 or any internal components thereof such as the computing resource 116, the virtual controller 117A, the processing resource 112A, and the second machine-readable medium 114A. In some examples, the recovery management system 108 may monitor an operating status of the computing resource 116 and the source node 102 to determine if they have experienced the failure condition. At block 506, if it is determined that there exists no failure condition for the computing resource 116 and/or the source node 102, the recovery management system 108 may continue to perform the check at block 506.

However, at block 506, if it is determined that the computing resource 116 or the source node 102 have experienced the failure condition, at block 508, the recovery management system 108 may determine that it is required to restore the computing resource 116 on the recovery node 104. Consequently, at block 510, the recovery management system 108 may trigger a resource restore operation on the recovery node 104. In some examples, the resource restore operation may cause copying a subset of the objects from the backup 124 on the backup storage node 106 to the recovery node 104 to form, from the subset of objects, the partial filesystem instance 128 of the computing resource 116 on the recovery node 104 that is operable as the restored computing resource 116' on the recovery node 104. The copying of the subset of the objects from the backup 124 may include operations at blocks 512, 514, and optionally one or both of blocks 516, 518.

At block 512, the recovery management system 108 may enable transfer of objects corresponding to the metadata tree 216 from the backup 124 to the recovery node 104 to form the partial filesystem instance 128. In some examples, at block 512, the recovery management system 108 may enable transfer of objects such as the root object 202 and the inodes 212. In some examples, the intermediate metadata objects between the root object 202 and the inodes 212 may be recreated on the recovery node 104 by the virtual controller 117B based on the content of the inodes 212 using a hash function. In certain other examples, the intermediate metadata objects between the root object 202 and the inodes 212 may also be transferred to the recovery node 104 from the backup storage node 106 in addition to the root object 202 and the inodes 212. The objects of the metadata tree 216 may be stored in the object store 130 once copied to the recovery node 104.

Figure 6A:
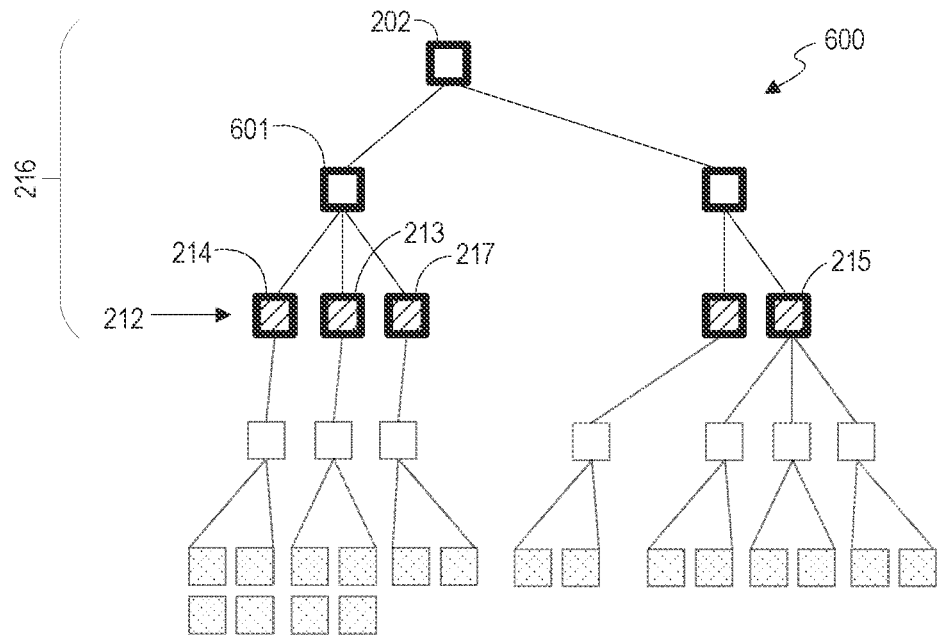
FIGS. 6A-6F depict partial filesystem instances formed on a recovery node at various time instances during a resource recovery operation, in accordance with an example.

Referring now to FIG. 6A, a partial filesystem instance 600 formed at the completion of the operation at block 512 (i.e., at time T1) is depicted, in accordance with an example. As such, the partial filesystem instance 600 may be representative of the partial filesystem instance 128 at the time of completion of the operation at block 512. For example, metadata objects that are marked with thicker outlines are materialized on the recovery node 104, thereby forming the partial filesystem instance 600 at time T1. In some examples, the intermediate metadata objects between the root object 202 and the inodes 212 may be recreated on the recovery node 104 by the virtual controller 117B based on the content of the inodes 212 using a hash function. For example, an intermediate metadata object 601 may be formed by applying a hash function on the inodes 213, 214, and 217. Accordingly, the intermediate metadata object 601 may include cryptographic hash signatures of content of the inodes 212. Other intermediate metadata object may be formed in a similar fashion. Further, FIG. 6A also depicts certain objects having fighter outlines for illustration, as these objects with lighter outline are unmaterialized at time T1.

Referring again to FIG. 5, at block 514, the recovery management system 108 may enable transfer of objects corresponding to the boot file of the computing resource 116 to the recovery node 104 to form the partial filesystem instance 128 on the recovery node 104. In some examples, at block 514, the recovery management system 108 may enable transfer of the data objects 210 corresponding to the boot file. In some examples, to enable the transfer of the objects 210 corresponding to the boot file, the recovery management system 108 may cause the virtual controller 117B on the recovery node 104 to identify an inode corresponding to the boot file. As described in FIG. 2, the inode 214 represents the boot file and such information regarding the inodes 212 (including the inode 214) is stored in the root object 202. The virtual controller 1173 may determine that the inode 214 represents the boot file based on information contained in the root node 202 and/or the inode 214 that are already materialized on the recovery node 104.

Accordingly, the virtual controller 117B may request objects corresponding to the inode 214 representing the boot file from the backup storage node 106. Accordingly, the data objects 210 corresponding to the boot file may be transferred to the recovery node 104. Once the data objects 210 are received on the recovery node 104, the virtual controller 117B on the recovery node 104 may recreate a leaf metadata object corresponding to the data objects 210 using a hash function on the data objects 210. In some examples, the hash function may be same as the one used to create the leaf metadata object 208 on the source node 102. Accordingly, once the operation at block 514 is performed, a partial file system instance as depicted in FIG. 6B may be formed on the recovery node 104.

Figure 6B:
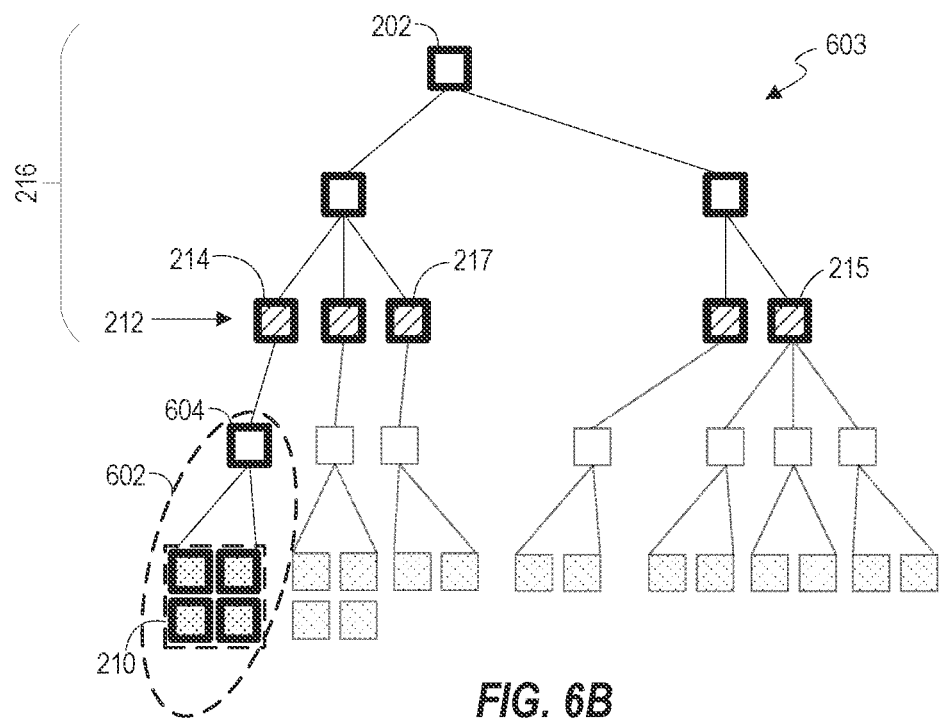

Referring now to FIG. 6B, a partial filesystem instance 603 formed at the completion of the operation at block 514 (i.e., at time T2) is depicted, in accordance with an example. As such, the partial filesystem instance 603 may be representative of the partial filesystem instance 128 at the time of completion of the operation at block 514. When the data objects 210 corresponding to the boot file are transferred to the recovery node 104, a leaf metadata object 604 may be created on the recovery node 104. The leaf metadata object 604 may be same as the leaf metadata object 208. The leaf metadata object 604 may store, as its content, a hash of the data objects 210. The data objects 210 and the leaf metadata object 604 corresponding to the boot file may be stored in the object store 130 once copied to the recovery node 104. Accordingly, a file object tree 602 including the leaf metadata object 604 and the data objects 210 corresponding to the boot file that are marked with thicker outlines is materialized on the recovery node 104, thereby forming the partial filesystem instance 603 at time T2. Further, FIG. 6B also depicts certain objects having lighter outlines for illustration, as these objects with lighter outline are unmaterialized at time T2.

Moving back to FIG. 5, in some examples, at block 516, the recovery management system 108 may enable transfer of objects corresponding to a read-ahead context file of the computing resource 116 to the recovery node 104 to form the partial filesystem instance 128. The read-ahead context file may include read-ahead prediction details corresponding to the computing resource 116 at the time of last update of the backup 124. In some examples, at block 516, the recovery management system 108 may enable transfer of the data objects 222 corresponding to the read-ahead context file. In some examples, to enable the transfer of the objects 222 corresponding to the read-ahead context file, the recovery management system 108 may cause the virtual controller 117B to identify an inode corresponding to the read-ahead context file. As described in FIG. 2, the inode 217 represents the read-ahead context file and, as previously noted, such information regarding the inodes 212 (including the inode 217) may be stored in the root object 202. The virtual controller 117B may determine that the inode 217 represents the read-ahead context file based on information contained in the root node 202 and/or the inode 217 that are already materialized on the recovery node 104.

Accordingly, the virtual controller 117B may request objects corresponding to the inode 217 representing the read-ahead context file from the backup storage node 106. Accordingly, the data objects 222 corresponding to the read-ahead context file may be transferred to the recovery node 104. Once the data objects 222 are received on the recovery node 104, the virtual controller 117B on the recovery node 104 may recreate a leaf metadata object corresponding to the data objects 222 using a hash function on the data objects 222. Accordingly, once the operation at block 516 is performed, a partial file system instance as depicted in FIG. 6C may be formed on the recovery node 104.

Figure 6C:
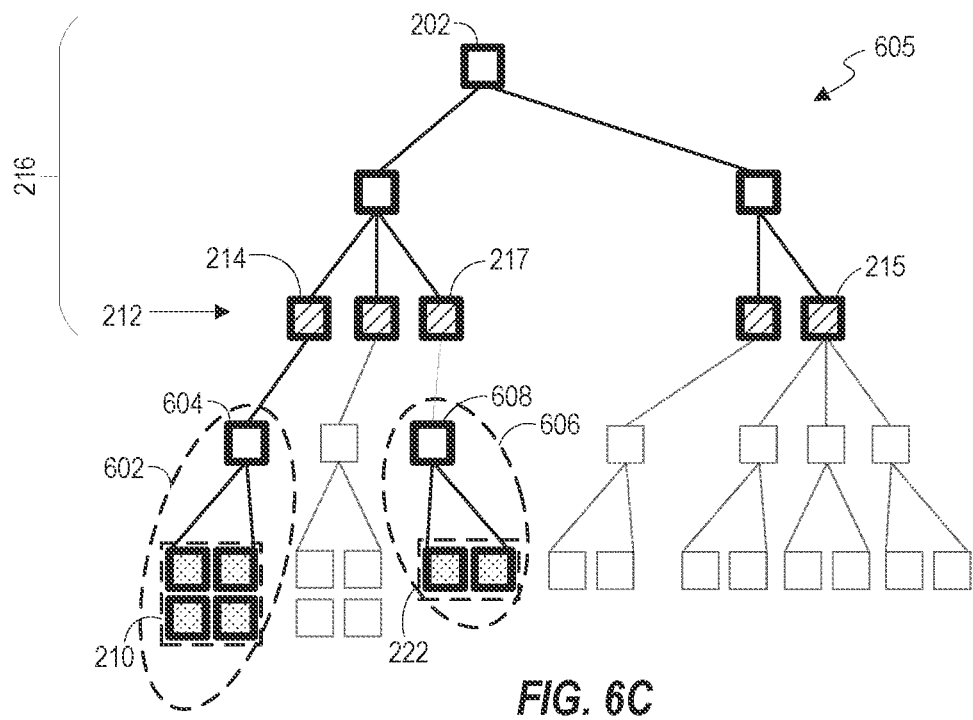

Referring now to FIG. 6C, a partial filesystem instance 605 formed at the completion of the operation at block 516 (i.e., at time T3) is depicted, in accordance with an example. As such, the partial filesystem instance 605 may be representative of the partial filesystem instance 128 at the time of completion of the operation at block 516. When the data objects 222 corresponding to the read-ahead context file are transferred to the recovery node 104, a leaf metadata object 608 may be created on the recovery node 104. The leaf metadata object 608 may store, as its content, a cryptographic hash of the data objects 222. The data objects 222 and the leaf metadata object 608 corresponding to the read-ahead context file may be stored in the object store 130 once copied to the recovery node 104. Accordingly, a file object tree 606 including the leaf metadata object 608 and the data objects 222 corresponding to the read-ahead prediction file that are marked with thicker outlines are materialized on the recovery node 104, thereby forming the partial filesystem instance 605 at time T3. Further, FIG. 6C also depicts certain objects having lighter outlines for illustration as these objects with lighter outline are unmaterialized at time T3.

Turning back to FIG. 5, in some examples, at block 518, the recovery management system 108 may enable transfer of objects corresponding to a cache file of the computing resource 116 to the recovery node 104 to form the partial filesystem instance 128. The cache file may include cached metadata and data corresponding to the computing resource 116 at the time of last update of the backup 124. In some examples, at block 518, the recovery management system 108 may enable transfer of the data objects 220 corresponding to the cache file. In some examples, to enable the transfer of the objects 220 corresponding to the cache file, the recovery management system 108 may cause the virtual controller 117B to identify an inode corresponding to the cache file. As described in FIG. 2, the inode 215 represents the cache file and, as previously noted, such information regarding the inodes 212 (including the inode 215) may be stored in the root object 202. The virtual controller 117B may determine that the inode 215 represents the cache file based on information contained in the root node 202 and/or the inode 215 that are already materialized on the recovery node 104.

Accordingly, the virtual controller 117B may request objects corresponding to the inode 217 representing the cache file to the backup storage node 106. Accordingly, the data objects 220 corresponding to the cache file may be transferred to the recovery node 104. Once the data objects 220 are received on the recovery node 104, the virtual controller 117B on the recovery node 104 may recreate a leaf metadata object corresponding to the data objects 220 using a hash function on the data objects 220. Accordingly, once the operation at block 516 is performed, a partial file system instance as depicted in FIG. 6D may be formed on the recovery node 104.

Figure 6D:
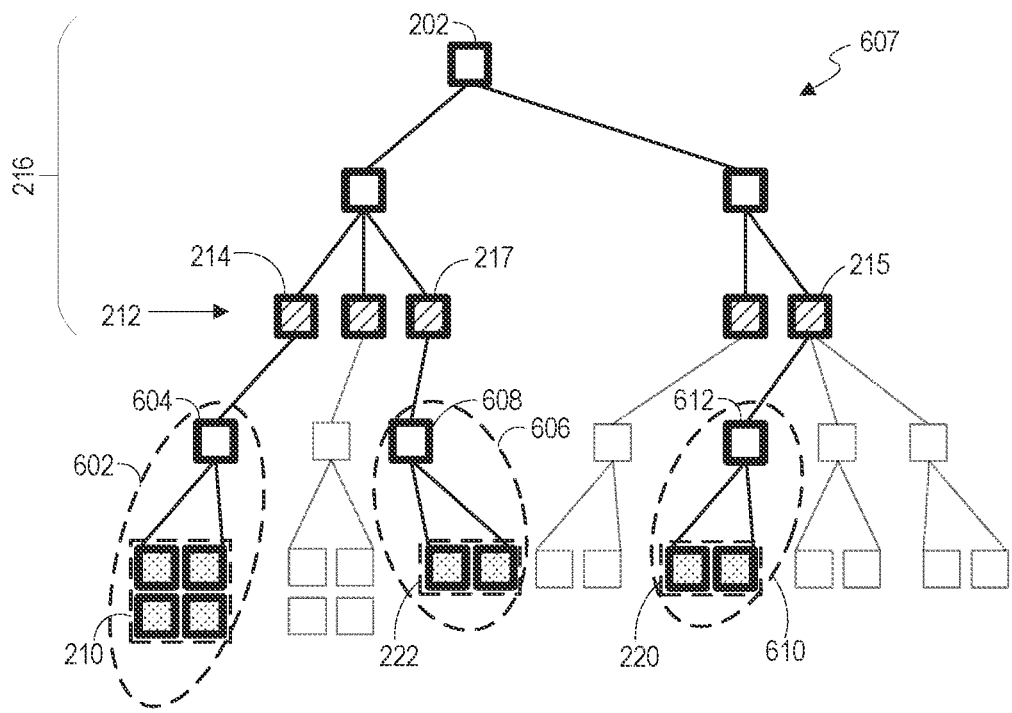

Moving to FIG. 6D, a partial filesystem instance 607 formed at the completion of the operation at block 518 (i.e., at time T4) is depicted, in accordance with an example. As such, the partial filesystem instance 607 may be representative of the partial filesystem instance 128 at the time of completion of the operation at block 518. When the data objects 220 corresponding to the cache file are transferred to the recovery node 104, a leaf metadata object 612 may be created on the recovery node 104. The leaf metadata object 612 may store, as its content, a cryptographic hash of the data objects 220. The data objects 220 and the leaf metadata object 612 corresponding to the cache file may be stored in the object store 130 once copied to the recovery node 104. Accordingly, a file object tree 610 including the leaf metadata object 612 and the data objects 220 corresponding to the cache file that are marked with thicker outlines are materialized on the recovery node 104, thereby forming the partial filesystem instance 607 at time T4. Further, FIG. 6D also depicts certain objects having lighter outlines for illustration as these objects with lighter outline are unmaterialized at time T4.

Although, the operations at blocks 512-518 are shown as being performed sequentially, in certain examples, the operations at blocks 512-518 may be performed in any given order or in parallel, without limiting the scope of the present disclosure. Further, the operations at some of the blocks 512-518 may be optional. For examples, the operation at block 510 may include performing the operations at blocks 512 and 514; whereas the blocks 516, 518 may be optional. In some examples, operations at any one or both of the blocks 516, 518 may be performed in addition to the operations at blocks 512 and 514. After execution of the operations at blocks 512-518, the partial filesystem instance 607 as depicted in FIG. 6D may be formed on the recovery node 104 and the corresponding objects may be stored in the object store 130. Further, in some examples, transfer of the subsets of objects at blocks 512-518 may include pushing the subsets of objects from the backup storage node 106 to the recovery node 104. In certain other examples, the transferring of subsets of objects at blocks 512-518 may include pulling or downloading the subsets of objects by the recovery node 104 from the backup storage system 106. In one example, the virtual controller 1178 of the recovery node 104 may download the subsets of objects under a supervisory control and/or direction of the recovery management system 108.

Moreover, in some examples, virtual controller 1178 may boot the computing resource 116 as the restored computing resource 116' on the recovery node 104 after the transfer of the objects corresponding to the boot file (i.e., at time T2) and the operations at blocks 516 and 518 may be performed after booting the restored computing resource 116'. In certain other examples, the operations at blocks 512-518 may be performed either sequentially (in any order) or in parallel and the restored computing resource 116' may be booted after the operations described at blocks 512-518 had been performed.

Furthermore, in some examples, at block 520, unmaterialized objects may dynamically be added to the partial filesystem instance 128 by copying corresponding objects from the backup storage node 106. In some examples, the partial filesystem instance 128 may be asynchronously updated from the backup 124 sometime after the restored computing resource 116' is booted. By way of example, any unmaterialized objects may be materialized on the recovery node 104 on a need basis. For example, a given set of unmaterialized objects may be materialized if there is a demand or request to access the given set of unmaterialized objects or in accordance with access prediction sequence defined in the read-ahead context file.

Figure 6E:
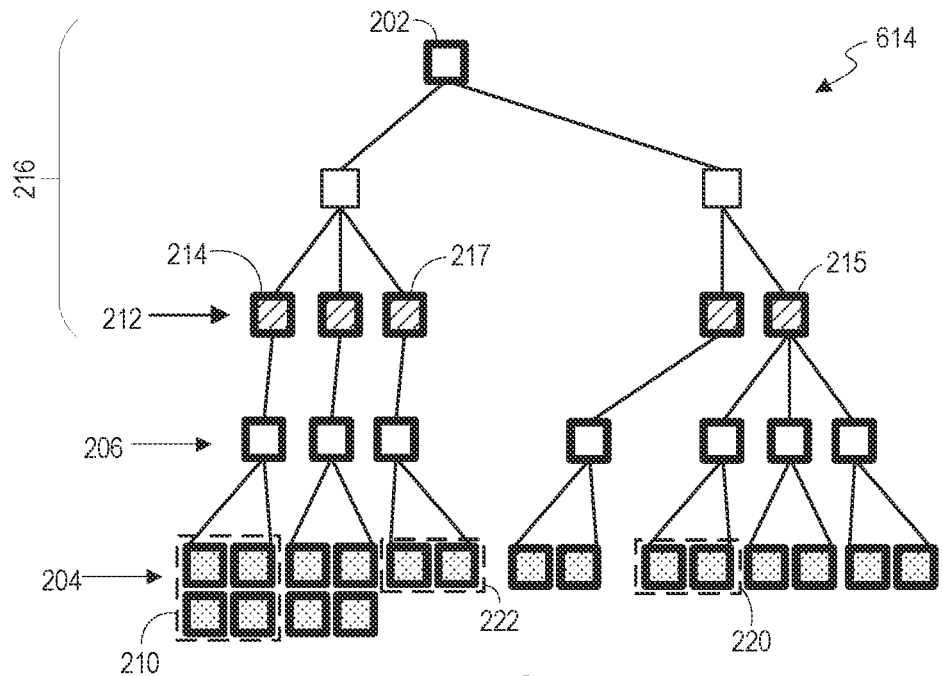

During such process of dynamically materializing the unmaterialized objects, at certain point in time (e.g., time T5), all of the objects of the backup 124 may be transferred to the recovery node 104. Consequently, a fully materialized filesystem instance 614 (e.g., a fully restored filesystem instance) as depicted in FIG. 6E may be formed on the recovery node 104. In FIG. 6E, all of the objects of the backup 124 are shown to have been fully materialized (i.e., identified with thick outline), thereby forming a filesystem instance 614 (fully-materialized). The filesystem instance 614 of FIG. 6E may look similar to the source filesystem instance 122 and include objects marked with similar reference numerals.

Figure 6F:
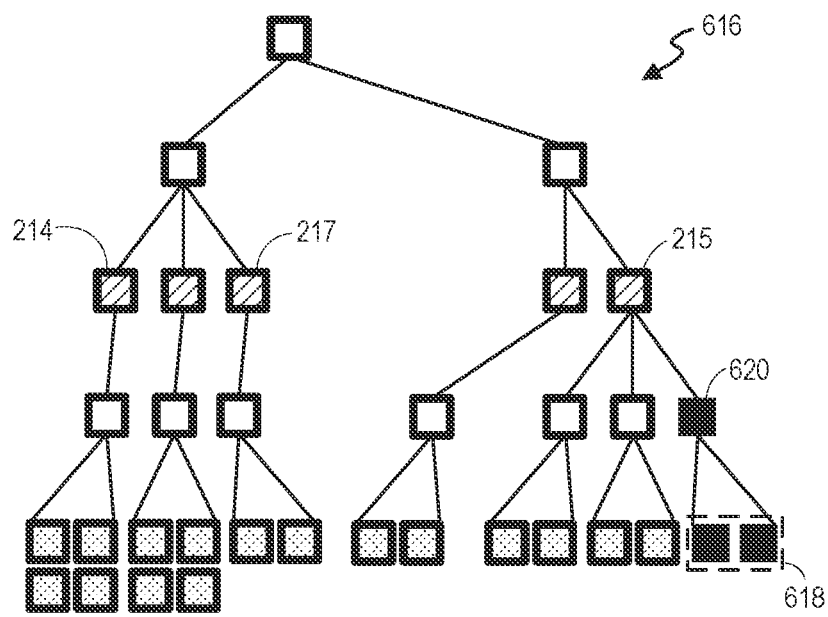

However, in certain examples, not every object of the backup 124 may be materialized on the recovery node 104. For example, in certain instances, a particular file may be overwritten which may in turn lead to certain corresponding objects being overwritten. In such an instance, a new data and/or metadata objects may be created on the recovery node 104 and added to the partial filesystem instance 128, Accordingly, such overwritten objects may not be transferred to the recovery node 104. FIG. 6F depicts one such example partial filesystem instance 616, in accordance with an example. In the partial filesystem instance 616, the data objects 618 and the leaf metadata object 620 are overwritten objects. Accordingly, corresponding objects may not be transferred from the backup 124 to the recovery node 104.

Figure 7:
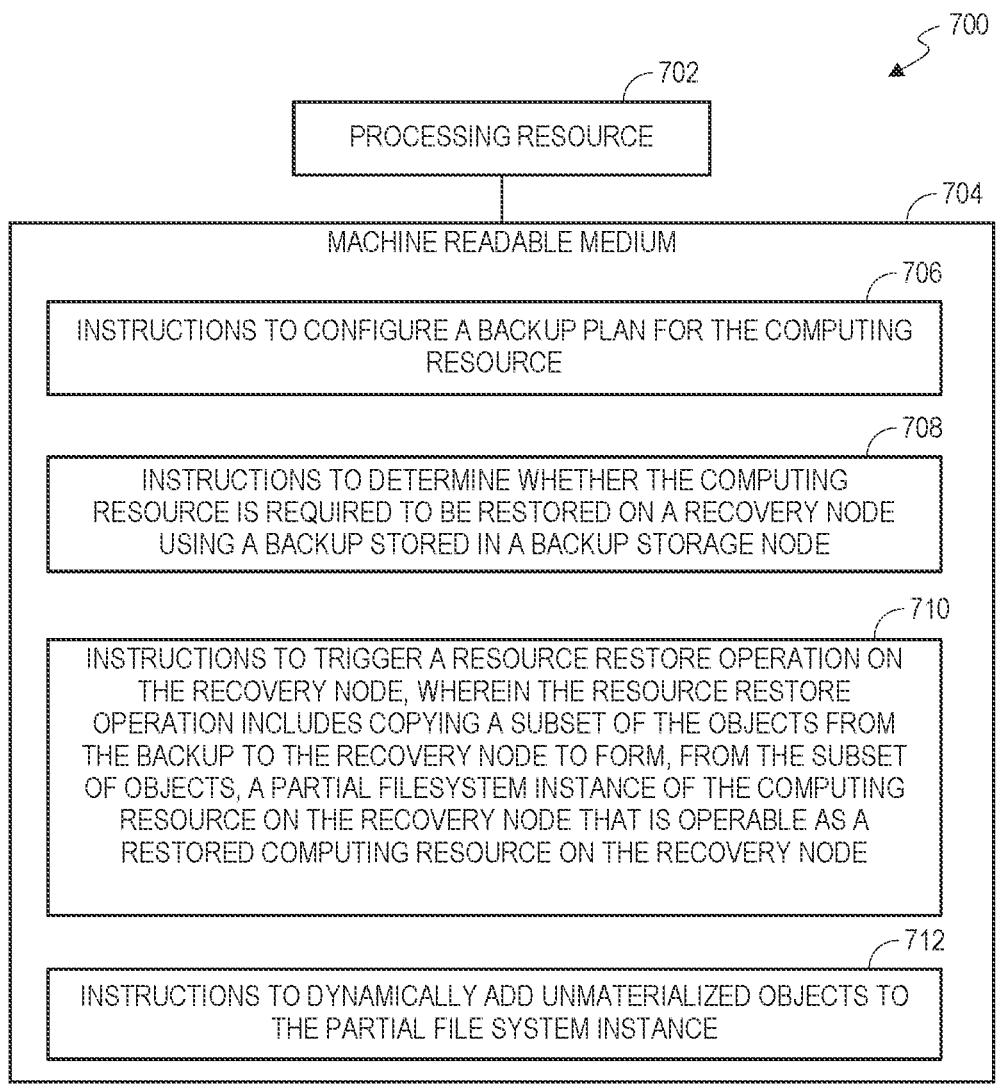
FIG. 7 is a block diagram depicting a processing resource and a machine-readable medium encoded with example instructions to restore a computing resource, in accordance with an example.

Moving to FIG. 7, a block diagram 700 depicting a processing resource 702 and a machine-readable medium 704 encoded with example instructions to restore a computing resource, in accordance with an example. The machine-readable medium 704 may be non-transitory and is alternatively referred to as a non-transitory machine-readable medium 704. In some examples, the machine-readable medium 704 may be accessed by the processing resource 702. In some examples, the processing resource 702 may represent one example of the processing resource 132 of the recovery management system 108 of FIG. 1. Further, the machine-readable medium 704 may represent one example of the machine-readable medium 134 of the recovery management system 108 of FIG. 1.

The machine-readable medium 704 may be any electronic, magnetic, optical, or other physical storage device that may store data and/or executable instructions. Therefore, the machine-readable medium 704 may be, for example, RAM, an EEPROM, a storage drive, a flash memory, a CD-ROM, and the like. As described in detail herein, the machine-readable medium 704 may be encoded with executable instructions 706, 708, 710, and 712 (hereinafter collectively referred to as instructions 706-712) for performing one or more methods, for example, the method 400 described in FIG. 4 or the method 500 of FIG. 5. The instructions 706-712 may represent one example of the instructions 136.

The processing resource 702 may be a physical device, for example, one or more CPU, one or more semiconductor-based microprocessor, one or more GPU, ASIC, FPGA, other hardware devices capable of retrieving and executing the instructions 706-712 stored in the machine-readable medium 704, or combinations thereof. In some examples, the processing resource 702 may fetch, decode, and execute the instructions 706-712 stored in the machine-readable medium 704 to restore the computing resource on the recovery node 104. In certain examples, as an alternative or in addition to retrieving and executing the instructions 706-712, the processing resource 702 may include at least one IC, other control logic, other electronic circuits, or combinations thereof that include a number of electronic components for performing the functionalities intended to be performed by the recovery management system 108 of FIG. 1.

The instructions 706 when executed by the processing resource 702 may cause the processing resource 702 to configure a backup plan for the computing resource 116 to store the backup 124 of the computing resource 116 in the backup storage node 106 as the content addressable storage of objects. Further, the instructions 708 when executed by the processing resource 702 may cause the processing resource 702 to determine whether the computing resource 116 is required to be restored on the recovery node 104 using the backup 124, Furthermore, the instructions 710 when executed by the processing resource 702 may cause the processing resource 702 to trigger the resource restore operation on the recovery node 104 in response to determining that the computing resource 116 is required to be restored.

The resource restore operation may include copying a subset of the objects from the backup 124 to the recovery node 124 to form, from the subset of objects, a partial filesystem instance of the computing resource on the recovery node that is operable as the as the restored computing resource 116' on the recovery node 104. In some examples, the copying a subset of the objects may include transferring the objects corresponding to a metadata tree 216, the objects corresponding to the boot file of the computing resource 116; and one or both of the objects corresponding to a read-ahead context file of the computing resource 116 and the objects corresponding to a cache file of the computing resource 116 (see description at blocks 512-518 of FIG. 5). Moreover, in some examples, the instructions 712 when executed by the processing resource 702 may cause the processing resource 702 to trigger dynamic adding of unmaterialized objects to the partial filesystem instance 128 by copying corresponding objects from the backup 124.

While certain implementations have been shown and described above, various changes in form and details may be made. For example, some features, functions, and/or formulas/equations that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details, Other implementations may include modifications, combinations, and variations from the details discussed above. It is intended that the following claims cover such modifications and variations.

I claim:

1. A method comprising:
configuring, by a processor based system, a backup plan for a computing resource to store a backup of the computing resource in a backup storage node as a content addressable storage of objects;
determining, by the processor based system, whether the computing resource is required to be restored on a recovery node using the backup of the computing resource stored in the backup storage node; and
triggering, by the processor based system, a resource restore operation on the recovery node in response to determining that the computing resource is required to be restored, wherein the resource restore operation comprises: copying a subset of the objects from the backup to the recovery node to form, from the subset of objects, a partial filesystem instance of the computing resource on the recovery node that is operable as a restored computing resource on the recovery node.

2. The method of claim 1, wherein the computing resource comprises one or more of a virtual machine, a container, a database, a logical disk, or a containerized application.

3. The method of claim 1, wherein configuring the backup plan comprises:
registering the source node and the backup storage node with the processor based system to create and update the backup of the computing resource in the backup storage node; and
defining a backup policy to update the backup of the computing resource in the backup storage node.

4. The method of claim 1, wherein determining whether the computing resource is required to be restored comprises determining whether one or both of the computing resource and the source node have experienced a failure condition.

5. The method of claim 1, wherein copying the subset of the objects from the backup comprises transferring objects corresponding to a metadata tree to the recovery node to form the partial filesystem instance.

6. The method of claim 5, wherein copying the subset of the objects further comprises transferring objects corresponding to a boot file of the computing resource to the recovery node to form the partial filesystem instance.

7. The method of claim 5, wherein copying the subset of the objects further comprises transferring objects corresponding to a read-ahead context file from the backup to the recovery node to form the partial filesystem instance, wherein the read-ahead context file comprises read-ahead prediction details corresponding to the computing resource at the time of last update of the backup.

8. The method of claim 5, wherein copying the subset of the objects further comprises transferring objects corresponding to a cache file from the backup to the recovery node to form the partial filesystem instance, wherein the cache file comprises cached metadata and data corresponding to the computing resource at the time of last update of the backup.

9. A recovery management system, comprising:
a machine-readable medium storing executable instructions; and
a processing resource coupled to the machine-readable medium, wherein the processing resource executes the instructions to:
configure a backup plan for a computing resource to store a backup of the computing resource in a backup storage node as a content addressable storage of objects;
determine whether the computing resource is required to be restored on a recovery node using the backup of the computing resource stored in the backup storage node; and
trigger a resource restore operation on the recovery node in response to determining that the computing resource is required to be restored, wherein the resource restore operation comprises: copying a subset of the objects from the backup to the recovery node to form, from the subset of objects, a partial filesystem instance of the computing resource on the recovery node that is operable as a restored computing resource on the recovery node.

10. The recovery management system of claim 9, wherein, for the resource restore operation, the processing resource enables a transfer of objects corresponding to a metadata tree to the recovery node to form the partial filesystem instance.

11. The recovery management system of claim 9, wherein, for the resource restore operation, the processing resource further enables a transfer of objects corresponding to a boot file of the computing resource to the recovery node to form the partial filesystem instance.

12. The recovery management system of claim 9, wherein, for the resource restore operation, the processing resource further enables a transfer of objects corresponding to a read-ahead context file from the backup to the recovery node to form the partial filesystem instance, wherein the read-ahead context file comprises read-ahead prediction details corresponding to the computing resource at the time of last update of the backup.

13. The recovery management system of claim 9, wherein, for the resource restore operation, the processing resource further enables a transfer objects corresponding to a cache file from the backup to the recovery node to form the partial filesystem instance, wherein the cache file comprises cached metadata and data corresponding to the computing resource at the time of last update of the backup f.

14. A non-transitory machine-readable medium storing instructions executable by a processing resource, the instructions comprising:
instructions to configure a backup plan for a computing resource to store a backup of the computing resource in a backup storage node as a content addressable storage of objects;

instructions to determine whether the computing resource is required to be restored on a recovery node using the backup of the computing resource stored in the backup storage node; and instructions to trigger a resource restore operation on the recovery node in response to determining that the computing resource is required to be restored, wherein the resource restore operation comprises: copying a subset of the objects from the backup to the recovery node to form, from the subset of objects, a partial filesystem instance of the computing resource on the recovery node that is operable as a restored computing resource on the recovery node.

15. The non-transitory machine-readable medium of claim 14, wherein the instructions to determining whether the computing resource is required to be restored comprises instructions to determine whether one or both of the computing resource and the source node have experienced a failure condition.

16. The non-transitory machine-readable medium of claim 14, copying the subset of the objects from the backup filesystem instance comprises transferring objects corresponding to a metadata tree to the recovery node to form the partial filesystem instance.

17. The non-transitory machine-readable medium of claim 14, wherein copying the subset of the objects further comprises transferring objects corresponding to a boot file of the computing resource to the recovery node to form the partial filesystem instance.

18. The non-transitory machine-readable medium of claim 14, wherein copying the subset of the objects further comprises transferring objects corresponding to a read-ahead context file from the backup to the recovery node to form the partial filesystem instance, wherein the read-ahead context file comprises read-ahead prediction details corresponding to the computing resource at the time of last update of the backup.

19. The non-transitory machine-readable medium of claim 14, wherein copying the subset of the objects further comprises transferring objects corresponding to a cache file from the backup to the recovery node to form the partial filesystem instance, wherein the cache file comprises cached metadata and data corresponding to the computing resource at the time of last update of the backup.

20. The non-transitory machine-readable medium of claim 14, further comprising instructions to trigger dynamic adding of unmaterialized objects to the partial filesystem instance by copying corresponding objects from the backup.

* * * * *